Sept. 6, 1938.  C. F. LAMBIN  2,129,431
ROTARY ENGINE
Filed Nov. 30, 1936   5 Sheets-Sheet 1

Inventor
Charles F. Lambin
By Raymond A. Rose
Attorney

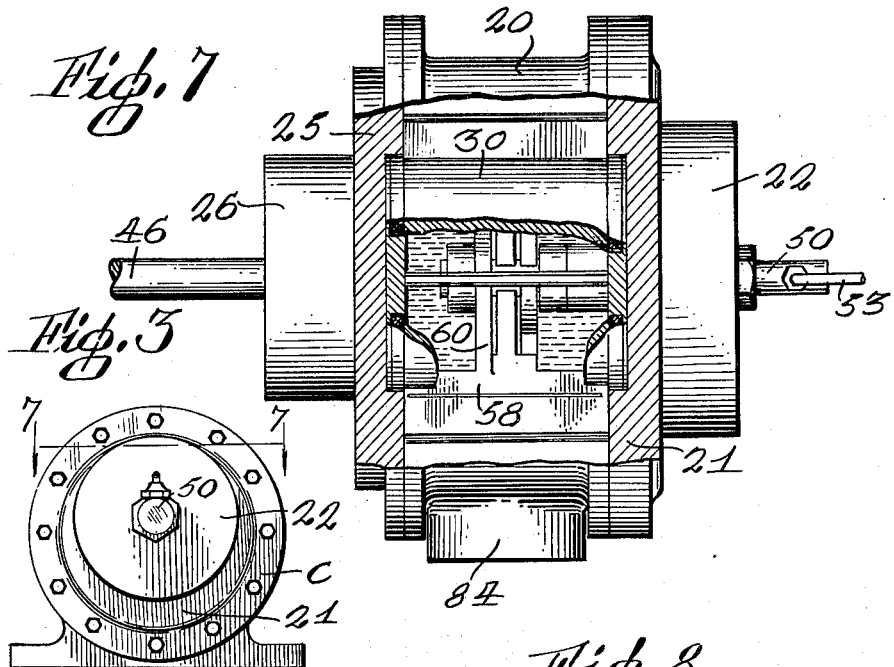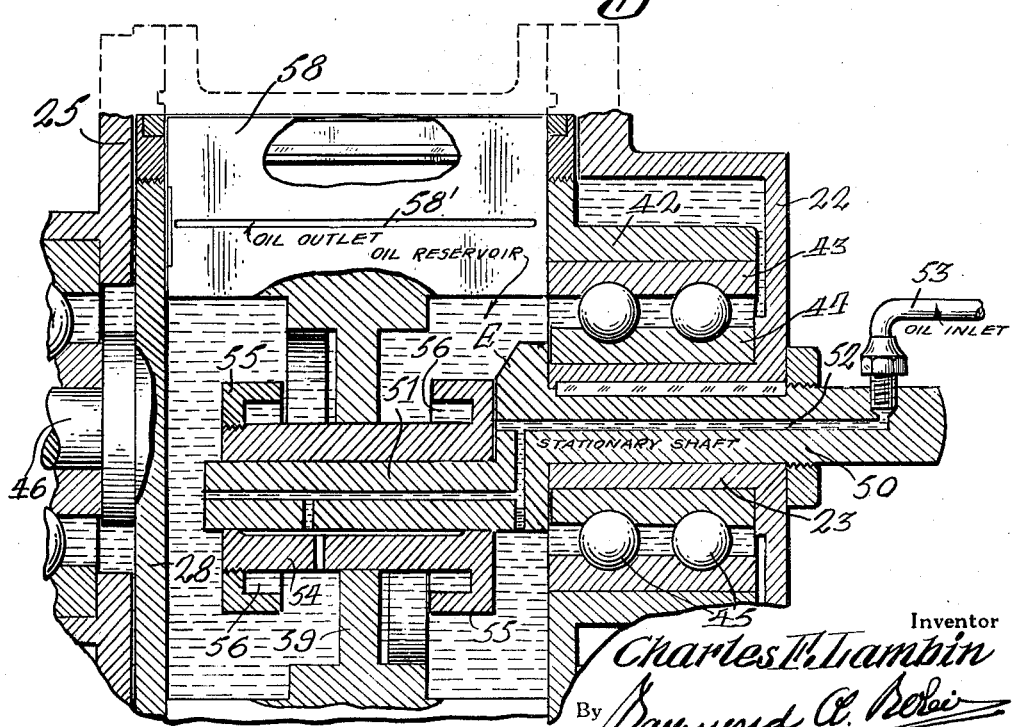

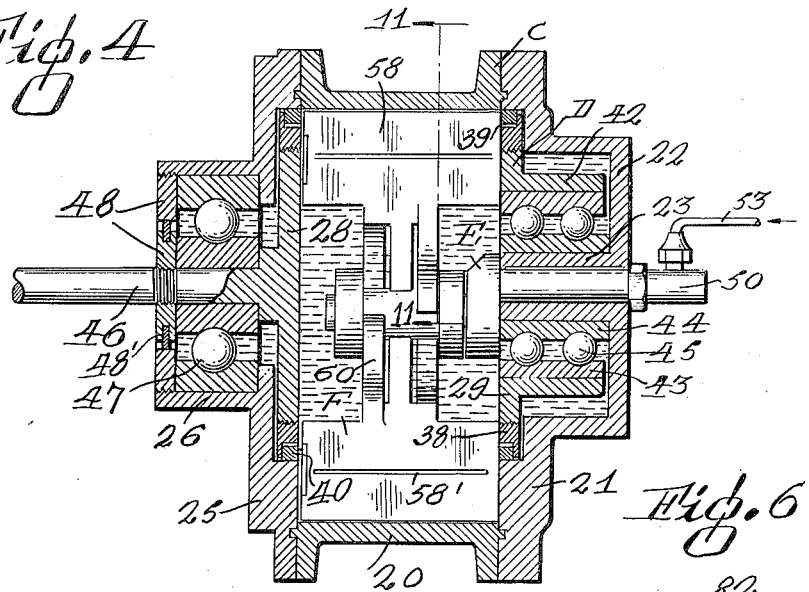
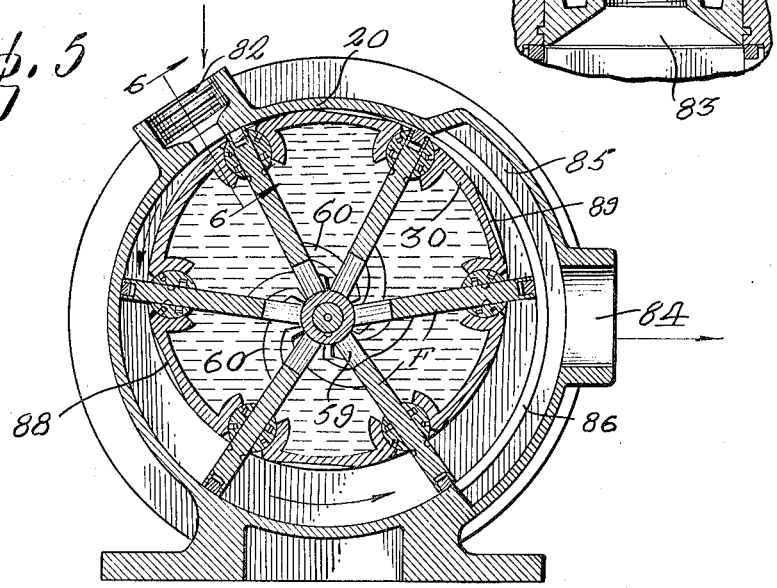

Sept. 6, 1938.  C. F. LAMBIN  2,129,431
ROTARY ENGINE
Filed Nov. 30, 1936  5 Sheets-Sheet 4

Inventor
Charles F. Lambin
By Raymond A. Robb
Attorney

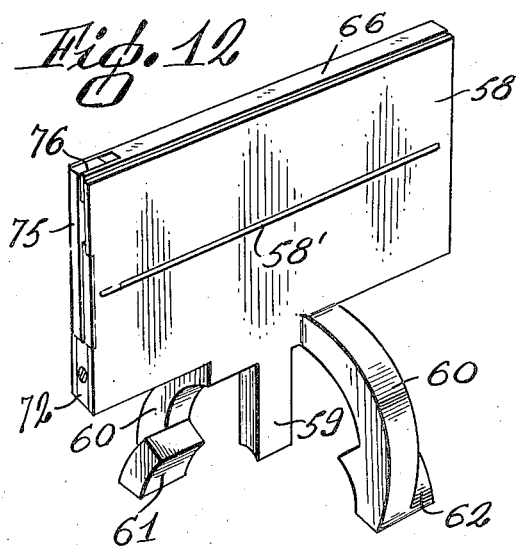
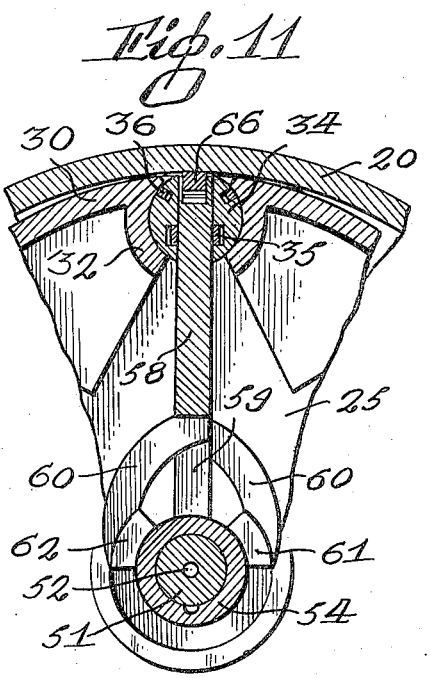
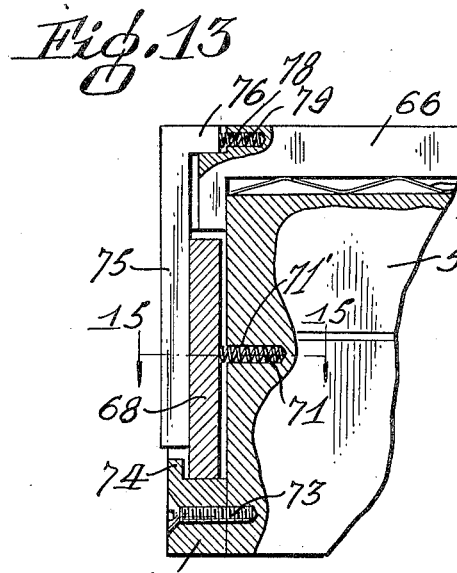
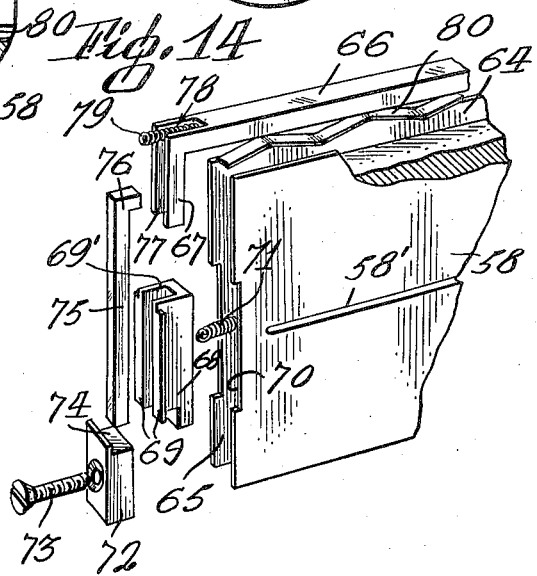
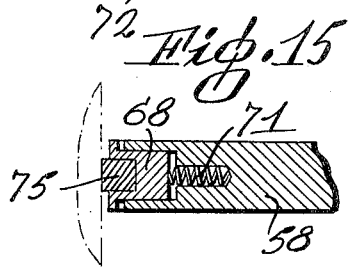

Patented Sept. 6, 1938

2,129,431

UNITED STATES PATENT OFFICE 2,129,431

ROTARY ENGINE

Charles F. Lambin, Montreal, Quebec, Canada

Application November 30, 1936, Serial No. 113,421

3 Claims. (Cl. 121—88)

The present invention relates to improvements in rotary engines particularly adapted for steam operation.

An object of the invention is the provision of a rotary engine of generally improved design.

Another object of the invention is the provision of a rotary engine equipped with novel and efficient piston bearing connections.

A further object of the invention is the provision of a rotary engine embodying long wearing and tight-fitting piston packing.

Still another object of the invention is the provision of a rotary engine having a highly efficient lubricating system.

A still further object of the invention is the provision of a rotary engine of the aforesaid character which is durable in construction and very efficient in operation.

Other objects and advantages of the invention will become apparent as the description progresses.

In the accompanying drawings forming a part of this specification and in which like reference characters are employed to designate corresponding parts throughout the same.

Figure 3 is a side elevational view of the same on a reduced scale,

Figure 4 is a vertical axial section taken on the line 4—4 of Figure 2,

Figure 5 is a vertical transverse section taken on line 5—5 of Figure 2,

Figure 6 is a section taken on the line 6—6 of Figure 5,

Figure 7 is a horizontal enlarged section taken on line 7—7 of Figure 3,

Figure 8 is an enlarged fragmentary section similar to Figure 4,

Figure 10:
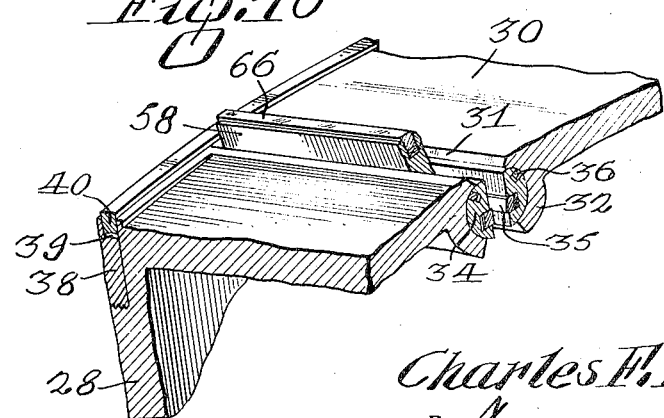

Figure 10 is a fragmentary perspective view of the rotor and one of the pistons, Figure 11 is a fragmentary transverse section taken on line 11—11 of Figure 4, Figure 12 is a perspective view of one of the pistons, Figure 13 is a side elevational view of one of the pistons partly broken away to illustrate interior construction, Figure 14 is a fragmentary perspective view of one of the pistons with packing elements in detached relation, and Figure 15 is an enlarged section taken on the line 15—15 of Figure 13.

Referring to the drawings, wherein for the purpose of illustration is shown a preferred embodiment of the invention, C generally designates the exterior casing or stator embodying a central, generally cylindrical section 20. To one side of the section 20 is bolted a round head 21 formed with a cylindrical laterally projecting bearing chamber 22 on an axis eccentric to the centre axis of the head and the centre casing section 20. At the axis of the bearing chamber 22 is formed a tubular socket 23. At the opposite side of the casing C is mounted a head 25, likewise of annular form adapted to be bolted to a flange on the centre section and formed with an annular bearing chamber 26 concentric with the bearing chamber 22 on the opposite head and eccentric to the axis of the casing.

Within the stator casing is rotatably mounted a rotor D embodying at one side a circular solid end wall 28 rotatably fitted within a correspondingly shaped recess in the inner face of the casing head 25. At the opposite side, the rotor is formed with an annular wall 29 rotatable in an annular recess or groove in the casing head 21. The end walls of the rotor are formed integral with a cylindrical shell 30 formed at spaced intervals with axially extending slots 31 terminating short of the side edges of the shell. Projecting inwardly of the shell at the margins of the slots are formed curved support ribs 32 extending the full length of the slots to define half-round grooves in the opposed walls of the slots.

In the half-round grooves in the walls of the slots are snugly fitted complementary rocker bearing sections 34, each in the form of an elongated metallic element of approximately semi-circular cross section. Each of the rocker bearing sections is formed with an elongated slot designed to receive a packing strip 35 spring pressed so as to tend to project slightly beyond the outer flat face of the bearing. Each of the sections is also formed with an outward slot adapted to support a spring pressed packing strip 36 which is yieldingly urged against the arcuate wall of the bearing retaining groove.

In a peripheral groove, at each end of the rotor D, is formed a holder ring 38 having threaded connection with the rotor and provided in its periphery with a groove 39 in which is fitted a resilient packing ring 40 adapted to provide a fluid-tight connection at each end of the rotor. As shown to advantage at Figure 5, the rotor is mounted to rotate about an axis eccentric to the axis of the stator cylinder.

The end 29 of the rotor is formed with a cylindrical sleeve 42 within which is fitted a race ring 43. A complementary race ring 44 is fitted on the sleeve 23. Balls 45 are disposed in the grooves of the race rings to provide an efficient ball bearing for the rotor on the casing. The opposite end 28 of the rotor is formed with an axial outwardly projecting shaft 46. A ball bearing assembly 47 is mounted between the stator sleeve 26 and the shaft 46, while the exterior of the bearing is normally covered by fluid-tight closure rings 48 threaded on the shaft and in the socket, said rings having an intermediate packing 48'.

An offset shaft E is fixed on the casing, one section 50 being keyed in the casing sleeve 23 at the axis of the rotor, while an offset section 51 projects within the stator cylinder along the axis of the cylinder. A lubricant conducting bore 52 is formed through the shaft and at the outer end connects with a feed tube 53. On the inner section 51 of the shaft E is keyed a bearing sleeve 54 provided at each end with a boss 55 the inner side of which is formed with an annular inwardly directed groove 56.

Figure 1:
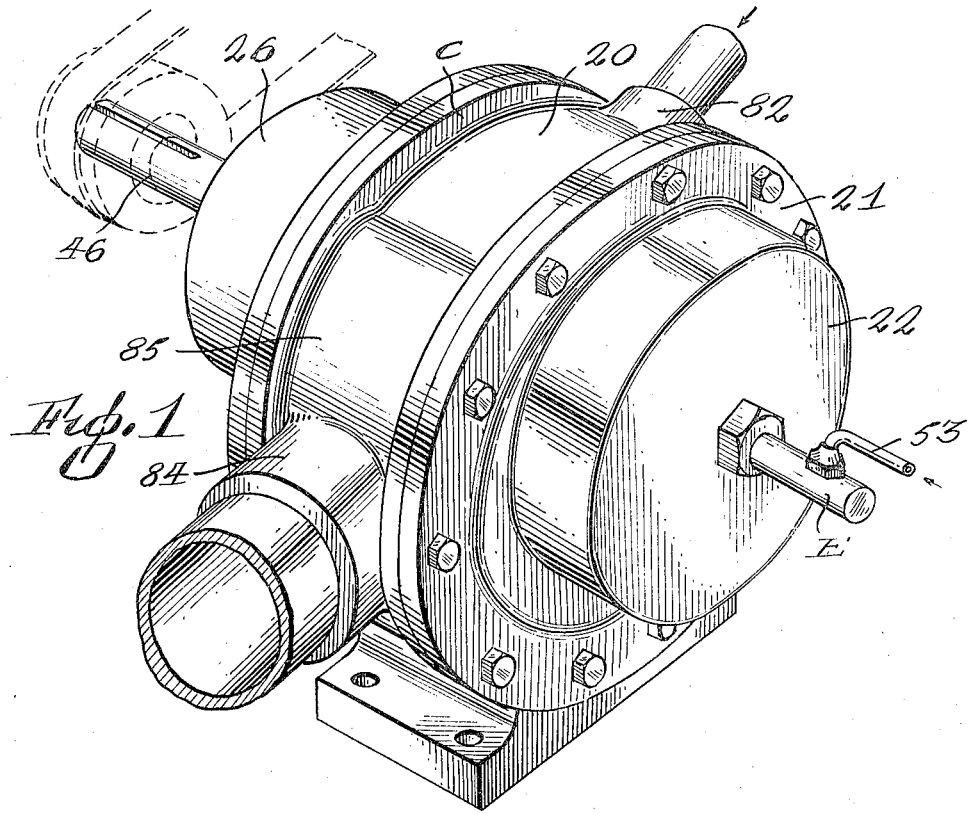
Figure 1 is a perspective view of the assembled engine.
Figure 2:
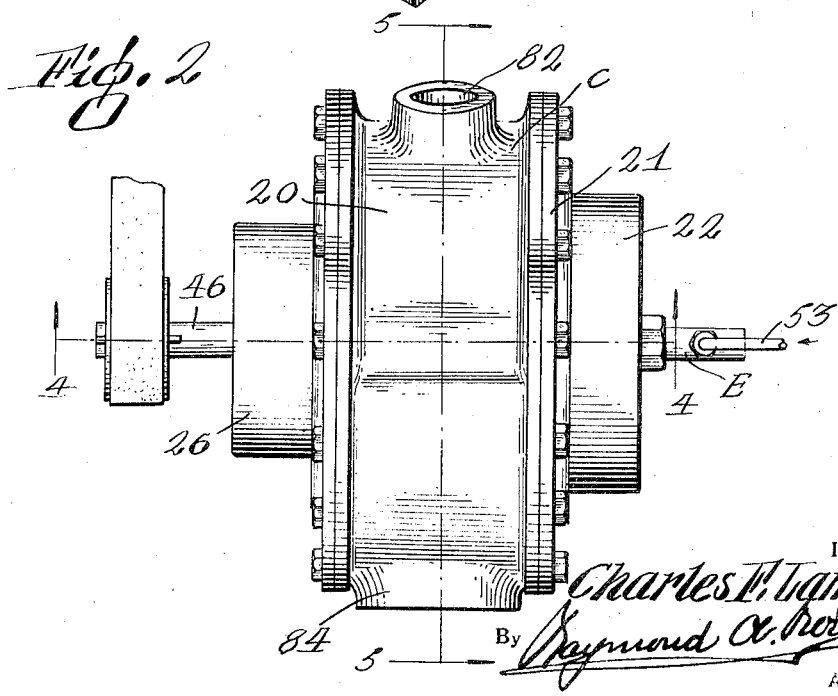
Figure 2 is a top plan view of the same.
Figure 9:
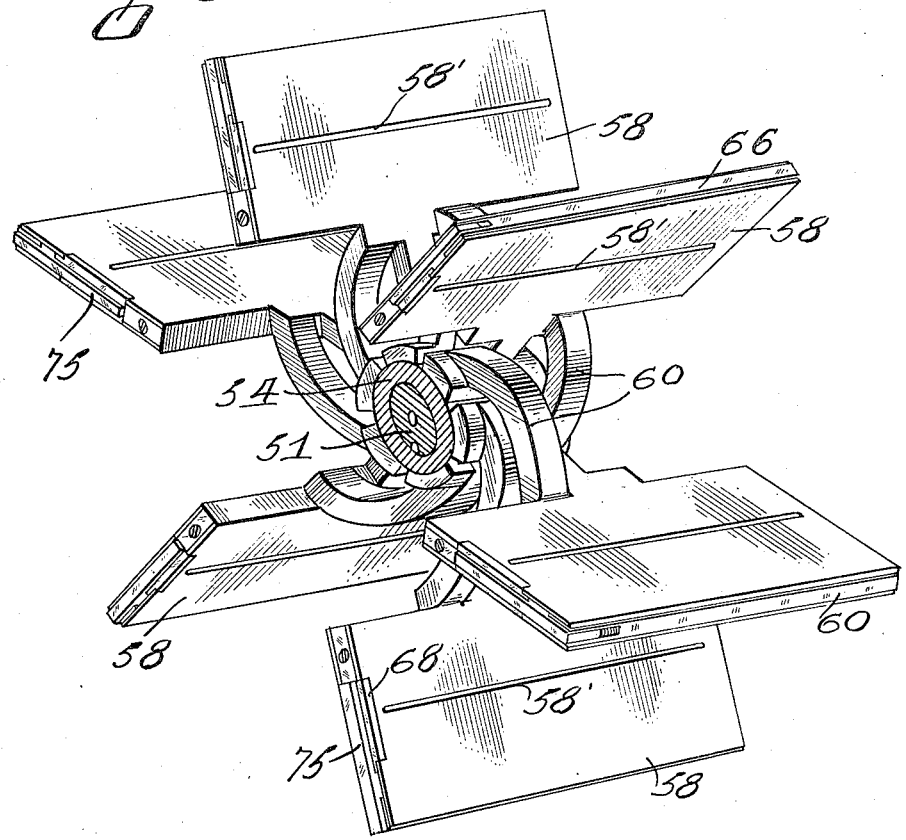
Figure 9 is a perspective view of the piston assembly.

Mounted radially within the stator cylinder and adapted to be rotated therein are a plurality of pistons or vanes F each embodying an outer main body in the form of a flat elongated rectangular blade 58 adapted to extend axially in the cylinder. At the inner central edge portion of each blade 58 is formed a straight inwardly projecting stem 59. At each side of the stem 59 is formed a curved bearing arm 60, the respective arms extending laterally in opposite directions, as shown to advantage at Figures 11 and 12, and constituting elements of approximately segmental curvature. At the inner end of each arm is formed a bearing foot 61 extending laterally of the end of the arm to form segmental bearing projections 62 adapted to fit into and rotate within the grooves 56 in the bosses 55 of the bearing sleeve 54. The interior bearing surface of each of the bearing feet 61 and the stem 59 is curved in conformity to the circumferential curvature of the bearing sleeve. When the complete set of pistons, in the present instance six, are assembled on the bearing sleeve of the shaft section 51 the bearing feet assume spaced segmental sections of a ring about the shaft, as shown to advantage at Figure 9. This provides a very efficient bearing connection for the pistons.

In the outer edge portion and in one side edge of the piston body or blade 58 are formed full length grooves 64 and 65. In the groove 64 is slidably fitted an elongated packing strip 66 of rectangular cross section extending the full length of the blade and formed at one end with a right angular relatively short leg extension 67 which is adapted to slidably fit in the outer portion of the groove 65. At the intermediate portion of the groove 65 is slidably inserted a channel-shaped fitting member 68 formed with laterally projecting flanges 69 at the outer side edges designed to fit into notches 70 in the blade to preclude lengthwise movement of the fitting. A coil spring 71 in a bore 71' in the blade tends to yieldingly thrust the channel fitting from the groove 65. Complete disconnection of the fitting from the blade is normally prevented by a fastening block 72 connected by a screw 73 to the inner end portion of the groove 65, the said block being formed with a lip 74 disposed to overlap a complementary projection on the base of the channel fitting, as shown at Figures 3 and 4. In the side groove 65 and in the groove 69' of the channel fitting 69 is slidably positioned the main elongated section of a packing strip 75. At the outer end, the strip 75 is formed with a right angularly projecting relatively short corner projection 76. When assembled, the outer end portion of the strip 75 slidably fits in a longitudinal groove 77 in the strip projection 67, while the short strip projection 76 slidably engages a short groove 78 in the end portion of the strip 66 to form an interfitting angular corner connection. A coil spring 79 fitted in a bore in the packing strip 66 bears against the end of the strip projection 76 and tends to thrust this end of the strip outwardly and against the end wall of the cylinder. An elongated corrugated leaf-spring 80 is interposed between the body portion of the packing strip 66 and the inner wall of the groove 64 and tends to yieldingly force the strip outwardly of the groove and against the interior peripheral surface of the stator cylinder. These packing strips and co-operative elements are preferably formed of suitable metallic construction.

Steam is admitted into the cylinder 20, for rotatably actuating the pistons, through an inlet 82 adapted for connection with a steam supply pipe and formed to provide an axially elongated intake port 83. At the outlet side, the cylinder is provided with an outlet connection 84 formed, at the central portion, of a segmental outwardly bulging section 85 formed arcuately on the cylinder. Within the bulging section of the casing, the cylinder is provided with a corresponding arcuate exhaust slot 86 designed for effectively exhausting steam from the cylinder.

At the exterior surface of the rotor body or shell 30, between the blades projecting therethrough, are formed flat tangential faces 88 designed to provide pockets to the closure point between the rotor and the cylinder to carry thereover condensate or other liquid matter which may accumulate between the blades.

The interior construction of the engine is efficiently lubricated by injecting oil under pressure through the feed pipe 53 and through the bore 52 in the shaft E, enabling the interior of the rotor to be filled or partly filled with lubricant. A limited quantity of lubricant is also projected with the pistons, through the medium of longitudinal grooves 58' formed in the faces of the blades, whereby small quantities of lubricant may be carried from the interior of the rotor through the rotor slots and into the cylinder.

This construction provides an engine which operates smoothly and efficiently. The particular mounting of the rotor and pistons provides for tight-fitting connection which, at the same time, make due allowance for expansion. The piston blades make a practically fluid-tight fitting in the cylinder but allow sufficiently for expansion under the heat to which the engine is subjected to preclude binding action. The provision of the novel bearing connection of the vanes with the fixed shaft about which the piston is rotated greatly contributes to the efficient operation of the engine. Furthermore, the arrangement of the two resilient packing strips in each of the rocker bearings enables maintenance of a large quantity of lubricant in the rotor for effective lubrication of the parts without leakage of steam therein.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. In a rotary engine a cylinder forming casing having inlet and exhaust ports, a fixed shaft having undercut-grooved bosses mounted in the cylinder at the axis thereof, a hollow rotor having axial slots mounted eccentrically within the cylinder, a power take off shaft secured to the rotor, a plurality of radial pistons having tight-fitting engagement with the circumferential wall of the cylinder and rotatable contact with the fixed shaft, the said pistons extending through the slots in the rotor, and spaced arcuate arms extending laterally from the inner ends of the pistons engageable with grooves in the bosses for connecting the pistons with the shaft.

2. In a rotary engine a cylinder forming casing having inlet and exhaust ports, a radially slotted rotor mounted eccentrically in the cylinder, a power take off shaft integral with the rotor, a fixed shaft supported in the cylinder at the axis thereof, a pair of spaced bosses on the shaft formed with annular grooves at their inner sides, a plurality of radial pistons fitted axially in the cylinder and extending through the rotor slots, and a plurality of arms at the inner end of each piston formed to rotatably engage the grooves of the bosses, said arms being arcuate and extending in opposite directions in planes lateral to that of the pistons.

3. In a rotary engine having a cylinder casing, a fixed shaft mounted axially within the cylinder, a radially slotted rotor journalled eccentrically inside the cylinder, and a power take off shaft integral with the rotor, a plurality of radial pistons extending through the rotor slots, bosses secured to the shaft and formed with undercut grooves, and arcuate laterally extending arms projecting inwardly from the pistons and engageable with the grooves of the bosses, whereby the pistons are pivotally secured to the shaft and prevented from twisting in the cylinder casing while retaining limited freedom of angular motion relative to each other.

CHARLES F. LAMBIN.